United States Patent [19]

Rirsch et al.

[11] Patent Number: 4,880,467
[45] Date of Patent: Nov. 14, 1989

[54] CEMENTITIOUS DOUGH OR PASTE COMPRISING AT LEAST ONE HYDRAULIC ELEMENT AND AT LEAST ONE POLYMER LATEX

[75] Inventors: Eric A. Rirsch, Billingshurst; Howard A. Barker, Horsham, both of United Kingdom

[73] Assignee: Redland Technology Limited, Surrey, United Kingdom

[21] Appl. No.: 102,960

[22] Filed: Oct. 1, 1987

[30] Foreign Application Priority Data

Oct. 3, 1986 [GB] United Kingdom ................. 8623745

[51] Int. Cl.$^4$ .............................................. C34B 24/28
[52] U.S. Cl. ...................................... 106/85; 106/90; 106/99
[58] Field of Search ............................. 106/85, 90, 99

[56] References Cited

U.S. PATENT DOCUMENTS

| | | | |
|---|---|---|---|
| 3,042,643 | 7/1962 | Foster | 106/90 |
| 3,538,036 | 11/1970 | Peters et al. | 106/90 |
| 3,591,395 | 7/1971 | Zonsveld et al. | 106/90 |
| 3,952,805 | 4/1976 | Persinski et al. | 106/90 |
| 4,261,754 | 4/1981 | Krenchel et al. | 106/90 |
| 4,363,667 | 12/1982 | Birchell et al. | 106/90 |
| 4,398,957 | 8/1983 | Ceska et al. | 106/90 |
| 4,414,030 | 11/1983 | Restrepo | 106/90 |
| 4,501,830 | 2/1985 | Miller et al. | 106/90 |

FOREIGN PATENT DOCUMENTS

| | | |
|---|---|---|
| 0021681 | 1/1981 | European Pat. Off. . |
| 0021682 | 1/1981 | European Pat. Off. . |
| 0030408 | 6/1981 | European Pat. Off. . |
| 0038126 | 10/1981 | European Pat. Off. . |
| 0055035 | 6/1982 | European Pat. Off. . |
| 1388349 | 3/1975 | United Kingdom . |
| 1388350 | 3/1975 | United Kingdom . |
| 2018737 | 10/1979 | United Kingdom . |
| 1563190 | 3/1980 | United Kingdom . |
| 2101984 | 1/1983 | United Kingdom . |
| 2162165 | 1/1986 | United Kingdom . |

*Primary Examiner*—William R. Dixon, Jr.
*Assistant Examiner*—David M. Brunsman
*Attorney, Agent, or Firm*—Beveridge, DeGrandi & Weilacher

[57] ABSTRACT

An uncured cementitious dough or paste, which is substantially free of particulate components having a diameter greater than 100 microns, said paste comprising in admixture;
(a) At least one hydraulic cement;
(b) at least one polymer latex, the polymer being present in an amount of 1 to 20 parts by weight per 100 parts of the cement;
(c) total water in an amount from 8 to 20 parts by weight of water per 100 parts by weight of cement.

A cured cementitious composition may be produced by heating said dough or paste at a temperature of above 100° C. and may be used for products such as roofing elements, for cladding the exterior walls of buildings and other building products.

19 Claims, No Drawings

CEMENTITIOUS DOUGH OR PASTE COMPRISING AT LEAST ONE HYDRAULIC ELEMENT AND AT LEAST ONE POLYMER LATEX

The invention relates to cementitious compositions and products made from such compositions. More particularly, the invention relates to compositions comprising a hydraulic cement, water, and an aqueous dispersion of a polymer latex.

By the term "polymer latex" in this specification, there is meant small particles, ie. colloidal particles, of water-insoluble polymeric material which are suspended in aqueous medium. Such particles are thermodynamically unstable with a tendency to decrease interfacial surface area by association to a macroscopic phase. We contrast the term polymer latex with a polymer solution which is considered to be a thermodynamically stable system.

By the term "hydraulic cement" in this specification, there is meant any material which sets and hardens by the addition of water, that is in the presence of water. The hydraulic cement may, for example, be a silicate cement such as Portland cement or it may be an alumi- nate cement. The term includes mixtures of two or more different hydraulic cements.

It should be noted that in the art relating to cementitious compositions, the terms cured and hardened are synonymous with each other.

In making cementitious products, it is desirable that the resultant product should be of high strength and especially high flexural strength. This is particularly important when the products are to be used as building products, for example roofing slates, and for use in such applications it is desirable that the products should not only have a flexural strength of at least 15 MPa and advantageously 40 MPa, but also good durability i.e. good resistance to:
  (a) variations in climatic conditions particularly freeze-thaw conditions and cycles of alternate rain and sunshine;
  (b) ultra-violet attack;
  (c) acid rain; and,
  (d) abrasion of surfaces by the elements
such that the strength of a product, e.g. a roofing slate is maintained throughout its life.

Cementitious products produced from an ordinary hydraulic cement phase consisting only of hydraulic cement and water generally have low strength, especially low flexural strength, and poor durability. For example, a roofing slate formed from a cementitious composition which comprises an ordinary hydraulic cement with a typical spread of particle size range and an amount of water which is conventionally used in such compositions may have a flexural strength as low as 5 to 10 MPa. Moreover unless substantial amounts of aggregate (i.e. sand or crushed rock or the like) are incorporated in such cementitious products they will not normally be durable in natural weathering conditions.

Various proposals have been made for improving the strength of such cementitious compositions. For example, it is known that the flexural strength and/or impact strength of a product formed from such a composition may be improved by including a fibre in the composition. Such fibre-reinforced-cement pastes are also sometimes acceptably durable in natural weather, the best known example being asbestos-cement.

Fibrous materials which have been used in the past to increase the flexural strength of cementitious products include fibres of asbestos, glass, steel, ceramic, polymeric and vegetable materials. The use of such fibres does, however, have certain disadvantages. The flexural strength of products made from compositions including such materials may be appreciably increased to a figure of the order of 40 MPa in the short and medium terms; however, in the long term the presence of the fibres may adversely affect the strength of the product because the fibres may suffer degradation due to alkali attack which, coupled with long term weathering, may also adversely affect the durability of the finished product. Moreover, the use of such fibrous materials may add to the difficulty of processing the cementitious composition and in the case of some fibres, for example, asbestos, may involve health hazards due to the carcinogenity and/or toxicity of the fibrous material.

A number of proposals have also been made for improving the strengths of cementitious products. For example, capital intensive high-pressure forming, compaction and vibration apparatus may be employed to produce products having low porosity and high flexural strength. Such proposals have been utilised for forming products from cement pastes, mortars and ceramic materials. A further proposal involves the addition of processing aids to the composition which enables the elimination, to a great extent, of voids in products made from such compositions. The only processing aids which have been found to be suitable for this purpose are water-soluble polymers and proposals for their use have been made particularly in the case of compositions having a low water/cement ratio (for example, below 30 parts by weight of water per 100 parts of hydraulic cement).

Examples of polymers which have been described in the prior art as processing aids are cellulose ethers, especially hydroxy propyl cellulose ether, and also polyacrylamides, hydrolysed polyvinyl acetates, and water dispersible polymers containing carboxyl groups. While all these processing aids give useful improvements in properties of cementitious products initially, it has been found in practice that the cementitious products lose the valuable initial properties and this is thought to be because after curing, the processing aid re-dissolves, swells or is degraded in the alkaline medium which is present in such cementitious products on prolonged exposure to weathering. Proposals for using such processing aids have described the use of up to 25% by weight of the processing aid in a cement/water composition.

Examples of published Patent Specifications describing cementitious compositions and products of the above type are British Patent Specification No. 1563190 and the following European Patent Specification Nos. 0021681; 0021682; 0030408; 0038126; and 0055035.

A large number of the compositions described in these patent specifications suffer from the drawback that they include a relatively large proportion of processing aids.

It is believed that the improved microstructure and increase in strength of products made from such compositions results in a large part from the effect of the polymers on the rheology of the composition mixture. However, it has been suggested that, in cured or hardened products obtained from the compositions, the polymers act as an adhesive between the cementitious entities of the composition. In this case the strength of the bond provided by the polymer, will depend, amongst other factors, upon the water content of the composition. Ultimately, therefore, there will be a significant loss of strength because the polymer will re-dissolve or lose strength or degrade if sufficient water is available. Thus, a number of the compositions described in the specifications listed above, while possessing relatively high initial flexural strength when dry, do not have adequate strength when wet or adequate durability for use as building products. This has been demonstrated for the products made from such compositions by the marked decrease in flexural strength when tested under conditions simulating those experienced by building products, for example in water absorption tests or tests involving repeated freezing and thawing of the products, or tests involving repeated wetting and drying.

We have found that products with relatively small amounts of water-soluble polymer are less susceptible to attach by water, i.e. the hardened composition has a low strength when saturated with water compared to the strength in the dry state, and such products may also suffer gradual loss of strength during exposure to water and will break down when subjected to freeze-thaw conditions or wetting and drying cycles. Such products are less expensive to produce than those taught by the prior art because the water soluble polymer is an expensive component of the compositions.

In our copending Patent Application No. 8525723 we have disclosed that the susceptibility to water and natural weathering is reduced by the addition of a reactive agent which effects chemical cross-linking between polymer chains, rendering the polymer insoluble in water and reducing the absorption of water and consequent swelling of the polymer and loss of strength of the product. Although strong water resistant and durable products can be obtained by this method we have found that, for some applications, it is preferable to overcome the environmental susceptibility of high strength cements by using polymer latices the dispersed particles of which are capable of coalescing on removal of water from a matrix which is stable in aqueous alkali or water especially at highly alkaline pH's as the processing aids for building products. In comparison with water-soluble polymers these additives are completely insoluble, do not form solutions and, as well as having inherent insolubility, act to reduce the permeability of the high strength cement paste. Such polymer latices are less expensive and are still economic even though somewhat larger amounts may have to be used for some applications in comparison to amounts of water soluble polymers.

The addition of polymer latices to mortars and concretes made with hydraulic cement is well known. Polymer latices impart greater plasticity and workability to the water and hydraulic cement mixture permitting a reduction in water/cement ratio consequently giving greater strength and impermeability in the cured product.

Polymer latices which have been proposed previously as cement modifiers include styrene-butadiene copolymers, natural rubber, vinyl acetate polymer, acrylic ester polymer and polyvinylidene chloride. These latices are commonly stabilised to prevent flocculation and coagulation at the high pH and ionic concentrations found in cement by steric or ionic stabilisation mechanisms.

By way of example U.S. Pat. No. 2,662,064 discloses a cementitious pumpable composition including cement, fibrous filler and stabilised latex. Similarly, Canadian Pat. No. 1143 385 discloses a cement filler combination with polymer latex.

In the current use of polymer latices in cement, water/cement ratios of 0.3 to 0.6 by weight are found at polymer-cement ratios of 0.05 to 0.20 by weight. Such binding systems are used with sand to form mortars for paving materials, floorings, adhesives, deck coverings and linings.

As a consequence of the high water cement ratio and air content, products produced from the above-described compositions are comparatively weak in flexural properties compared to those previously described where water-soluble polymers are used. Flexural strengths of 2 to 15 MPa are common. By reducing the water/cement ratio in such compositions and at the same time using special means to provide good compaction of the mortar or concrete, flexural strengths as high as 20 to 25 MPa may be obtained when the materials are dry (for example the concretes and mortars described in G.B. Pat. No. 2101984). However, when saturated or partially saturated with water these materials are reduced in strength typically by 30 to 40%.

The present invention has the aim of providing high strength products having low susceptibility to water and good durability from hydraulic cements modified by the addition of polymer latex.

Accordingly, the present invention provides an uncured cementitious dough or paste, which is substantially free of particulate components having a diameter greater than 100 microns, said paste comprising in admixture:

(a) at least one hydraulic cement;
(b) at least one polymer latex, the polymer being present in an amount of from 1 to 20 parts by weight per 100 parts of the cement;
(c) total water in an amount from 8 to 20 parts by weight of water per 100 parts by weight cement.

Preferably, the admixture comprises from 1 to 5 parts by weight of the polymer per 100 parts by weight of cement and from 12 to 16 parts by weight of water per 100 parts of cement.

The mechanism of strength increase by the use of water soluble polymers in cementitious compositions is uncertain, but scientific models have been proposed where the function of the polymer is said to be lubrication of the cement grains thus facilitating air exclusion under conditions of high shear and pressure and/or vacuum. Similarly the mechanism of rheological modification by latex addition is unclear, but one explanation is that the polymer latex envelopes and lubricates the individual cement grains.

In either case the water-soluble polymer or the latex polymer probably form a comatrix with the hydration products of the cement during the curing and drying process and thus improve the adhesion between cement particles.

Many types of polymer latex can be used to bring about the increased strength and durability in practising the present invention. Examples of suitable latices include; elastomeric polymers such as natural and synthetic rubber, thermoplastics such as polyacrylic esters, ethylene-vinyl acetate copolymers, polyvinylidene chloride and polyvinyl acetate, thermosetting resins such as epoxy resins. The polymers of the latices are water-insoluble, ie. they are hydrophobic polymers.

Preferably, latices with particle diameter below one micron are used in practising this invention.

The cementitious compositions may contain, in addition to the cement, water and latex, other materials known in the art. For example, these materials may include fibrous materials, finely divided fillers which are known in the art, dispersants and chemical modifiers which modify the setting ability of the composition. The fillers may include slate dust, various forms of sand, crushed minerals and the like so long as these contain substantially no particles greater than 100 microns diameter. Pigments may also be added to the composition to give the finished product a desired colour.

The cementitious compositions may furthermore comprise blast furnace slag or pulverised fuel ash or a natural or artificial pozzolan. In particular, it is preferred to include for 100 parts by weight of cement 5 to 20 parts by weight of fine silica particles having a particle size distribution substantially between 50 A and 0.5 microns, and known variously as silica fume, micro-silica or colloidal silica, because of the further improvement in durability which is thereby effected.

The composition according to this invention may also contain a water-soluble polymer as a rheology modifying additive. The hydraulic cement may be an ordinary Portland cement or a rapid hardening Portland cement.

The constituents of the cementitious composition are preferably subjected to high shear mixing in order to plasticise the compaction and convert it to a smooth paste or a material of dough-like consistency. The high shear mixing may be achieved, for example, in a Z-blade mixer or a twin-roll-mill. The paste or dough-like material may then be compressed and maintained under pressure until hardened in order to remove substantially all of the larger voids in the material. Alternatively it is sometimes advantageous to mix the particulate ingredients of the cementitious composition in some form of planetary mixer, for example, before adding the liquid ingredients during a second high shear mixing process under vacuum, for example in a vacuum extruder. The need to press for extended periods is thereby substantially reduced or eliminated.

It is to be understood, therefore, that the invention also includes a method of making a cementitious composition wherein the specified ingredients (a), (b), and (c) are mixed to produce a uniform composition and to remove all or substantially all of the voids from the composition. It will be understood that "the apparent volume" of the composition is equal to the volume including the solid component and its pores. It is preferred that the material is such that after hardening of the composition less than 2% of the apparent volume of the composition comprises pores having a size of greater than 100 microns and it is more preferred that less than 2% of the apparent volume of the composition comprises pores having a size of greater than 50 microns. In the most preferred composition less than 2% of the apparent volume of the composition comprises pores having a size greater than 15 microns.

The paste or dough-like material may subsequently be set and cured in a way generally known in the art to produce a desired finished product. This process may include pressing the paste or dough-like material and/or forming into a desired shape of product, and may also include curing which may be effected in a humid atmosphere for example up to 100% relative humidity, and/or with the application of heat to the product. The curing may be effected in an autoclave and the temperature may be above 100° C.; such a temperature is to be preferred when the cementitious composition contains the mixture of lime and silica as the hydraulic cement.

The cementitious composition may also comprise fibrous or textile reinforcement. Natural mineral fibres such as asbestos, vegetable fibres and other forms of cellulose fibre, glass fibres, artificial mineral fibres or artificial polymer fibres may be used. Polypropylene or polyethylene fibres or fibres made from a copolymer of these polyolefins are preferred. Polyolefin fibres which are fibrillated and have a secant elastic modulus of at least 100 GPa measured at 0.1% elongation are especially preferred. The synthetic fibres may have deniors in the range 5 to 40, e.g. 16, and may have lengths of between 5 mm and 15 mm, e.g. 10 mm.

The present invention includes cured materials produced from the cementitious compositions described above, and heat may be used to harden the compositions for example a mixture of lime and silica as the hydraulic cement wherein the composition is desirably hardened by heating at a temperature above 100° C.; such heating may be effected in an autoclave.

The materials and processes described may be used, for example, to produce building products such as tiles, artificial slates, pipes and other moulded items for use in conditions exposed to natural weathering or water. The invention is particularly suitable for providing roofing elements or for cladding the exterior walls of buildings.

The invention will now be described by way of example.

EXAMPLE 1

Sixty four grams of Dow 460 SBR latex (48% by weight of solids) were diluted with 216 grams of water and added to 1500 grams of Portland cement powder having a particle size of 95% less than 75 microns with mixing in a 4 litre capacity Z-blade mixer. After mixing for ten minutes a smooth mouldable paste was formed which was removed and hand rolled to form a sheet of approximately 5 mm thickness. The sheet was then cut into small sections and pressed between smooth forming plates at a pressure of 6 MPa for 18 hours. The resulting sheet was then removed and further cured at 50° C. and 100% relative humidity for 16 hours. The sheet was cut into test coupons 150 mm × 70 mm × 5 mm and allowed to dry naturally at ambient conditions for 13 days. Some of the coupons were then immersed in water at room temperature for 1 day prior to testing.

All coupons were tested by three-point bending and using the formula:

$$S = \frac{3 \, Wl}{bd^2}$$

where S = flexural strength
W = breaking load
l = span between supports and centre loading point
b = width
d = thickness The following results were obtained:
Dry strength—27 MPa
Wet strength—35 MPa The quantities of ingredients in the above example correspond to a water/cement ratio of 0.16 by weight and a polymer cement ratio of 0.02 by weight. The strength values found may be compared with a dry value of 20 MPa obtained from a cement paste prepared without polymer latex but with increased water cement ratio of 0.20 by weight. At a ratio of 0.16 by weight without latex it is not possible to form an integral sheet at the pressure used having flexural strength above 10 MPa.

In a test of the product durability, the ability to resist natural weathering processes was measured by an accelerated test, comprising elements of freeze-thaw, heating and cooling, and wetting and drying. Samples were placed with one face in contact with water by placing on saturated foam rubber for 5 days while alternating the temperature from +20° C. to −20° twice in a day thereby giving 10 cycles of freeze and thaw in this period. This was followed by subjecting the test pieces to a temperature of 70° C. in air for 2 days at a low relative humidity. When subjected to the ongoing freeze/thaw test as described above, all of the samples made according to the above example withstood at least 10 of the main cycles whereas all samples made from an unmodified cement paste had failed within 5 cycles.

In a further test of durability the water sensitivity of cured cement paste was measured by recording thickness changes that occur in immersion in alkaline water (pH 12) at 60° C. After 2 hours the 2% by weight latex cured paste had expanded by 0.08% whereas a similar strength paste prepared with hydroxypropylmethyl cellulose as the rheology modifier showed expansion of 0.25%.

In a further test of resistance to cyclic variations in moisture content coupons of the material described above were subjected to cycles consisting of 6 hours of immersion in water at room temperature, followed by 17 hours at 70° C. under drying conditions and 1 hour cooling at ambient conditions. The first cracks appeared in samples subjected to this test between 17 and 33 cycles. By comparison cracking was normally observed in similar strength samples prepared with hydroxypropylmethyl cellulose between 2 and 7 cycles.

EXAMPLE 2

Three hundred and thirty grams of Doverstand Revinex 29Y40 styrenebutadiene rubber latex containing 47% solids by weight and corresponding to 10.3% by weight addition was added to 1500 grams to the same Portland cement powder as used in Example 1 with mixing in 4 litre capacity Z-blade mixer. The smooth mouldable paste which formed was then lightly rolled on twin-roll mill to from a flat sheet which was pressed and cured as previously described in Example 1. On three-point bend testing dry and wet strength of 30 MPa and 35 MPa were recorded.

In the freeze-thaw durability test previously described all of the cured paste samples withstood more than 80 cycles without any failure whereas an average 50% of the hydroxypropylmethyl cellulose samples had failed within this period and all of the unmodified cement paste samples after five cycles.

In the water sensitivity test after 2 hours immersion at 60° C. 0.03% increase in thickness was recorded.

EXAMPLE 3

Example 2 was repeated except that the Doverstand styrene-butadiene rubber latex was first diluted with water at ratio of 2 parts latex dispersion with 1 part water resulting in a suspension of approximately 30% solids be weight. Three hundred grams of this suspension was blended with 1500 grams of cement powder as described in Example 1 giving a cured cement paste with solid styrene-butadiene rubber content of 6% by weight.

On testing in three point bending dry and wet strengths of 22 and 28 MPa respectively were obtained. In the freeze-thaw durability test described in Example 1 all of the cured paste samples withstood 80 cycles without failure.

EXAMPLE 4

Eighty grams of Rhom and Haas E330 acrylic latex at solid content of 47% by weight were diluted with 360 grams of water. This was blended with 2 kg of ordinary Portland cement powder as used in Example 1 by Z-blade mixing as described in Example 1 giving an approximate polymer cement ration of 2% by weight. After pressing and curing the hardened paste had dry and wet flexural strengths of 30 and 35 MPa respectively.

The quantities of ingredients in the above example correspond to a water/cement ratio of 0.20 by weight and a polymer/cement ratio of 0.02 by weight. The strength values found may be compared with those in the table below found for cement paste prepared by the same method, but without polymer latex, and for mortar prepared by conventional mixing techniques but with addition of polymer latex and comprising sand particles up to 2.4 mm diameter.

|  | Sand/cement Ratio | Water/cement Ratio | Polymer/cement Ratio | Flexural Strength | |
| --- | --- | --- | --- | --- | --- |
|  |  |  |  | Dry | Wet |
| Cement Paste | 0 | 0.20 | 0 | 20 MPa | — |
| Cement Paste plus latex as in this example | 0 | 0.20 | 0.02 | 30 MPa | 35 MPa |
| Latex Modified Mortar | 1 | 0.19 | 0.10 | 22 MPa | 12 MPa |
| Latex Modified Mortar | 2 | 0.27 | 0.19 | 13 Mpa | 6 MPa |
| Latex Modified Mortar | 3 | 0.28 | 0.09 | 10 MPa | 4 MPa |
| Similar Mortar without latex | 3 | 0.45 | 0 | 7 MPa | 6 MPa |

EXAMPLE 5

Four hundred grams of E330 latex described in Example 4 was diluted with 110 grams of water and mixed to a paste with 2 kg of cement powder as used in Example 1 in the afore-mentioned manner.

The cured sheet exhibited dry and wet flexural strengths of 42 and 43 MPa respectively.

In an additional experiment the impact strength of the cement paste in Example 5 was measured using a Zwick Charpy impact testing machine with 0.5 Joule arm. The cured paste described in Example 5 gave an average impact strength of 1400 Jm$^{-2}$ whereas a similar strength product obtained by the addition of 1% by weight of hydroxypropylmethyl cellulose gave an impact strength of 900 Jm$^{-2}$. EXAMPLE 6

Portland cement as used in Example 1, Doverstrand SBR latex emulsion (46% solids) and 10 mm long 38,000 denier fibrillated polypropylene fibres of an average 35 micron radius were mixed in the ratios by weight 100:24:2.5 in a continuous manner into a twin-screw extruder so that the high shear mixing action of the extruder blended these ingredients into a plastic dough-like consistency. At one section of the extruder barrel at a position downstream of the main plasticising action a means for providing a vacuum of 98.5% and simultaneously shearing the dough-like material was provided to substantially remove entrapped air from it. The de-aired dough was then passed through an extrusion die to provide a flat ribbon approximately 80 mm wide × 8 mm thick. The extruder barrel and die were cooled with water at 1° C. The extruded strips were pressed briefly to flatten them and improve the surface finish, then cured for 16 hours at 50° C. and 100% RH. The cured samples were cut into test coupons 150 mm × 70 mm × 5 mm and left to dry naturally at ambient conditions for 13 days. Some of the coupons were then immersed in water at room temperature for 1 day prior to testing. All the coupons were tested by three-point bending in the manner described in Example 1. Both the ultimate strength (i.e. the stress calculated from the formula in Example 1 corresponding to the greatest load, W, observed during the test) and the LOP (limit of proportionality; i.e. the stress corresponding to the point at which the load-deflection curve becomes non-linear) were recorded. The results were as follows:

|  | Ultimate stress | LOP |
| --- | --- | --- |
| Dry strength | 22 MPa | 18 |
| Wet strength | 23 MPa | 20 |

We claim:

1. An uncured cementitious dough or paste, which is substantially free of particulate components having a diameter greater than 100 microns said paste comprising in admixture:
  (a) at least one hydraulic cement;
  (b) at least one polymer latex, the polymer being present in an amount of 1 to 20 parts by weight per 100 parts of the cement;
  (c) total water in an amount from 8 to 20 parts by weight of water per 100 parts by weight cement; wherein said polymer latex is a member selected from the group consisting of natural rubber latex and a latex of a synthetic hydrophobic polymer.

2. A composition according to claim 1, wherein the admixture comprises from 1 to 5 parts by weight of the polymer per 100 parts by weight of cement and from 12 to 16 parts by weight of water per 100 parts of cement.

3. A cementitious composition according to claim 1 wherein the synthetic polymer is a synthetic rubber, a thermoplastic or a thermosetting resin.

4. A cementitious composition according to claim 3, wherein the synthetic rubber is a copolymer of styrene and butadiene, or the thermoplastic resin is a polyacrylic ester, polyvinyl acetate, polyethylene-vinyl acetate or polyvinylidene chloride, or the thermosetting resin is an epoxy, phenolic, urethane or acrylic resin.

5. A cementitious composition according to claim 1, which also contains a water-soluble polymer as a rheology modifying additive.

6. A cementitious composition according to claim 1, wherein the hydraulic cement is Portland cement or a rapid hardening Portland cement.

7. A cementitious composition according to claim 1, which also contains a finely divided filler containing particles having a diameter of less than 100 microns.

8. A cementitious composition according to claim 7, wherein the filler is blast furnace slag, pulverised fuel ash or a natural pozzolan.

9. A cementitious composition according to claim 8, wherein the pozzolan is amorphous silica with a particle size distribution substantially between 50 A and 0.5 microns.

10. A cementitious composition according to claim 1, which also comprises fibrous or textile reinforcement.

11. A cementitious composition according to claim 10, wherein the fibre is fibrillated polypropylene or polyethylene or a copolymer of both and has a secant elastic modulus of at least 10 GPa measured at 0.1% elongation.

12. A cementitious composition produced by curing a composition according to claim 1.

13. A cured cementitious composition produced by hardening a composition according to claim 1 and containing a mixture of lime and silica as the hydraulic cement wherein the composition is hardened by heating at a temperature above 100° C.

14. A cementitious composition as claimed in claim 12, produced by autoclaving the cementitious composition.

15. A method of making a cementitious composition according to claim 1, wherein the ingredients (a), (b) and (c) are mixed to produce a uniform composition and then subjected to high shear mixing in order to plasticise the composition and to convert the composition into a material of dough-like or paste-like consistency from which the voids are substantially removed by subjecting the soft material to vacuum or by applying pressure until the material has hardened.

16. A method as claimed in claim 15 wherein the high shear mixing is effected using a twin-roll mill or an extruder.

17. A composition when produced by the method of claim 15, wherein less than 2% of the apparent volume of the composition comprises pores having a size of greater than 100 microns.

18. A composition as claimed in claim 17, wherein the composition has less than 2% of the apparent volume of the composition comprises pores having a size of greater than 50 microns.

19. A composition as claimed in claim 18, wherein the composition has less than 2% of the apparent volume of the product of pores having a size of greater than 15 microns.

* * * * *